(12) United States Patent
Kouzaki et al.

(10) Patent No.: US 11,822,987 B2
(45) Date of Patent: Nov. 21, 2023

(54) PROCESSING DEVICE, IMAGE FORMING APPARATUS, IMAGE FORMING OPERATION SETTING METHOD, AND STORAGE MEDIUM

(71) Applicant: KONICA MINOLTA, INC., Tokyo (JP)

(72) Inventors: Masahiro Kouzaki, Toyohashi (JP); Koji Washio, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/051,116

(22) Filed: Oct. 31, 2022

(65) Prior Publication Data

US 2023/0153558 A1 May 18, 2023

(30) Foreign Application Priority Data

Nov. 12, 2021 (JP) .................................. 2021-184998
Nov. 12, 2021 (JP) .................................. 2021-185040

(51) Int. Cl.
*G06K 15/00* (2006.01)
*G06K 15/02* (2006.01)
*B41J 2/045* (2006.01)

(52) U.S. Cl.
CPC .......... *G06K 15/408* (2013.01); *B41J 2/0451* (2013.01); *B41J 2/04581* (2013.01); *G06K 15/1822* (2013.01)

(58) Field of Classification Search
CPC . G06K 15/408; G06K 15/1822; B41J 2/0451; B41J 2/04581
See application file for complete search history.

(56) References Cited

U.S. PATENT DOCUMENTS

2008/0079960 A1\* 4/2008 Yamazaki .............. B41J 29/393
358/3.03
2015/0224761 A1\* 8/2015 Sato ..................... B41J 2/04586
347/14

FOREIGN PATENT DOCUMENTS

JP 2012045831 A 3/2012

\* cited by examiner

*Primary Examiner* — Quang N Vo
(74) *Attorney, Agent, or Firm* — BUCHANAN INGERSOLL & ROONEY PC

(57) ABSTRACT

A processing device including a hardware processor that: determines a dot position at which a dot is to be generated by multiple recording elements arranged in a first direction on a medium which moves relative to the recording elements in a second direction crossing the first direction, based on tone data for each pixel of an image to be formed; determines a corrected dot number that is a number of a dot position by a malfunctioning recording element to which an offset number is added, wherein the malfunctioning recording element is set as a recording element by which a dot is not generated normally among the recording elements; and determines the corrected dot number of a dot position within a dot generation possible range by a recording element other than the malfunctioning recording element.

20 Claims, 8 Drawing Sheets

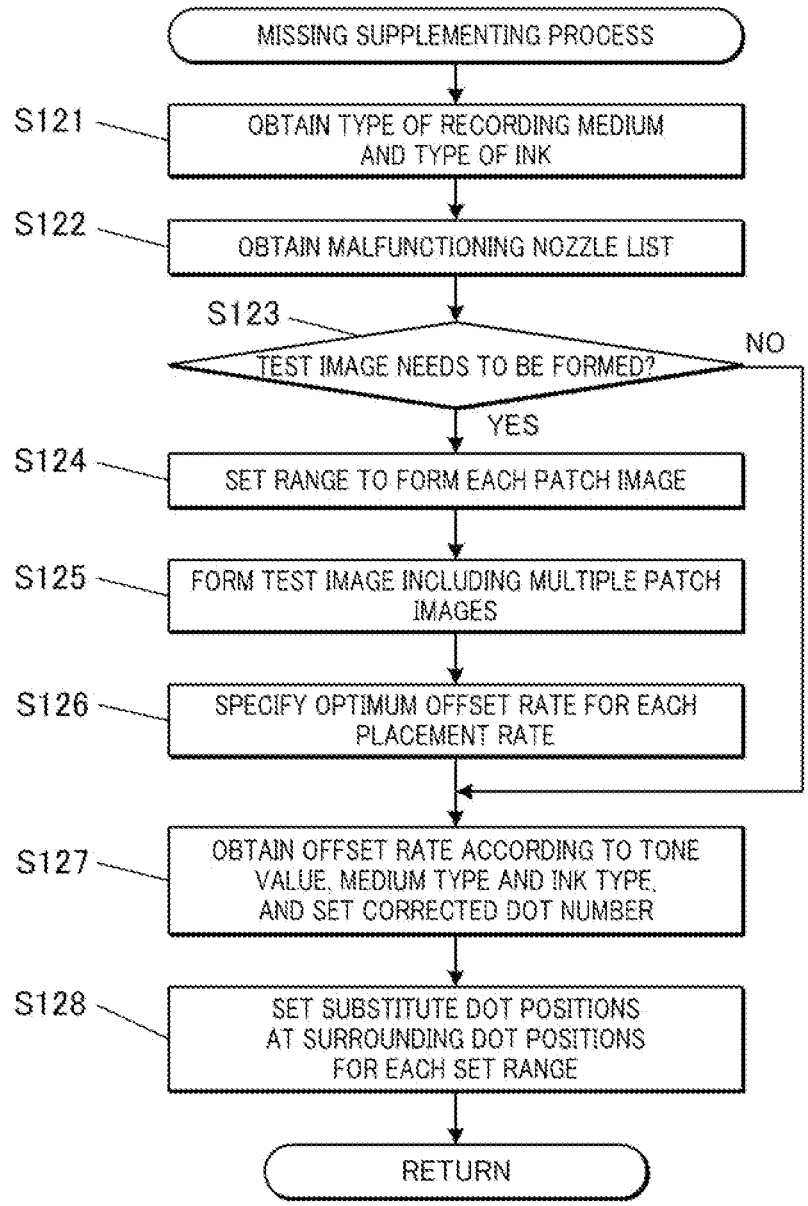

PROCESSING DEVICE, IMAGE FORMING APPARATUS, IMAGE FORMING OPERATION SETTING METHOD, AND STORAGE MEDIUM

CROSS-REFERENCE TO RELATED APPLICATIONS

The entire disclosure of Japanese Patent Applications No. 2021-184998 and No. 2021-185040 filed on Nov. 12, 2021 is incorporated herein by reference in its entirety.

BACKGROUND

Technological Field

This invention relates to a processing device, an image forming apparatus, an image forming operation setting method, and a storage medium.

Description of the Related Art

There is an image forming apparatus that forms images by operating recording elements that have a number of nozzles and driving elements such as piezoelectric elements that generate pressure fluctuations in the ink in the nozzles, to generate dots for them respectively. As the number of recording elements increases in accordance with the demand for higher resolution and higher precision of images, the probability of occurrence of malfunctioning recording elements that do not operate normally is also increasing. In contrast, there is a technology that supplements the image by having recording elements located in the vicinity, such as next to a malfunctioning recording element, operate instead.

However, if the operation setting of a malfunctioning recording element is merely uniformly supplemented by other recording elements, the desired image quality cannot necessarily be obtained. On the other hand, in JP 2012-45831A discloses a technique for reducing uneven density of formed images by performing halftone processing after determining the amount of tone correction according to the density tone of the image in the area to be corrected and performing tone correction.

SUMMARY

However, even within the range where the recording element is considered to be operating normally, minute irregularities can occur due to variations in dot positions and different characteristics of the medium on which images are formed. Even if the difference is at a level that would not be a problem if all recording elements were operating, in the case of supplementing for a malfunctioning recording element, a portion of the image may not be covered by the dots formed due to the difference from the original dot position of the malfunctioning recording element, and even if the density of the original image is adjusted and then converted to discharge data by halftone processing, and the like, the image degradation is not properly suppressed. In addition, since the density tone of the formed image varies nonlinearly depending on the condition of the medium and the image forming apparatus, the amount of tone correction required in the supplementary setting for a malfunctioning recording element also needs to be readjusted sequentially according to the above conditions, which is a time-consuming task.

The purpose of this invention is to provide a processing device, an image forming apparatus, an image forming operation setting method, and a storage medium capable of making settings pertaining to the supplementing of malfunctioning recording elements in a manner that more stably reduces the degradation of image quality.

To achieve at least one of the abovementioned objects, according to an aspect of the present invention, a processing device reflecting one aspect of the present invention is a processing device including a hardware processor that: determines a dot position at which a dot is to be generated by multiple recording elements arranged in a first direction on a medium which moves relative to the recording elements in a second direction crossing the first direction, based on tone data for each pixel of an image to be formed; determines a corrected dot number that is a number of a dot position by a malfunctioning recording element to which an offset number is added, wherein the malfunctioning recording element is set as a recording element by which a dot is not generated normally among the recording elements; and determines the corrected dot number of a dot position within a dot generation possible range by a recording element other than the malfunctioning recording element.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein:

FIG. 9 is a flowchart showing the control procedure for another example of the missing supplementing process.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
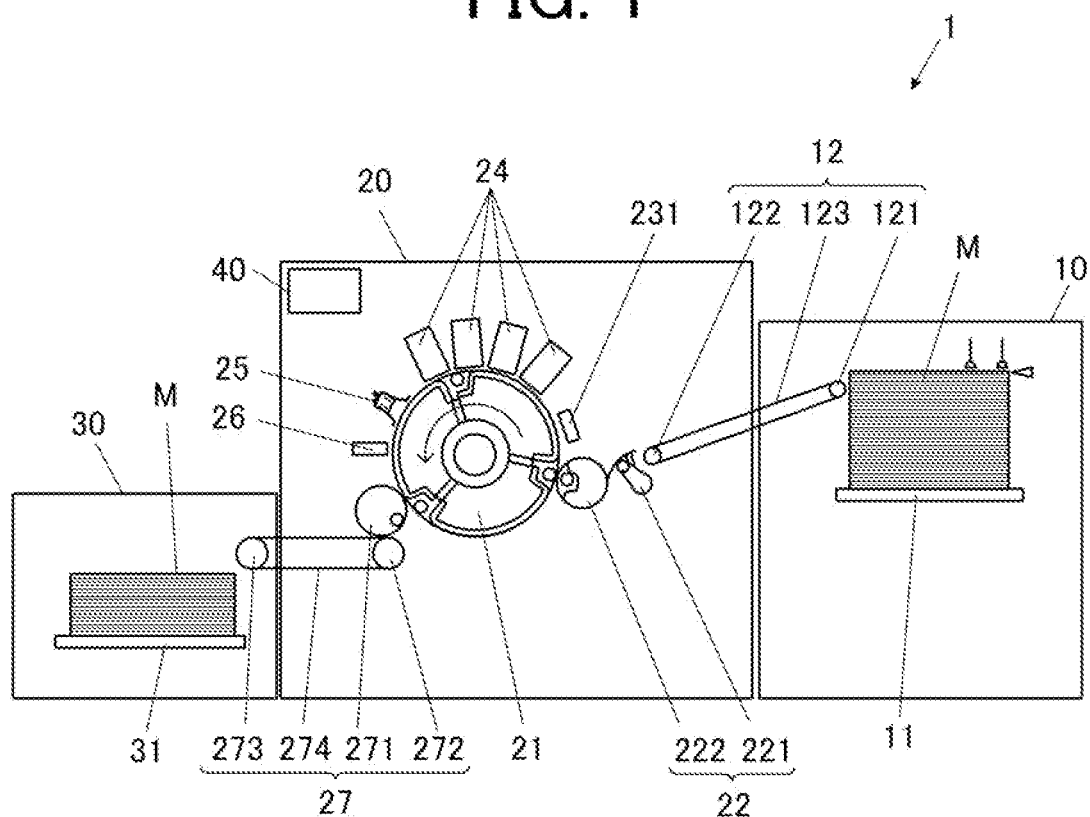
FIG. 1 is a schematic diagram of the overall configuration of the image forming apparatus including the processing device in the embodiment.

FIG. 1 is a schematic diagram of the overall configuration of the image forming apparatus 1 including the processing device in the embodiment. In this FIG. 1, the image forming apparatus 1 is shown viewed from the front.

This image forming apparatus 1 is an inkjet recording apparatus that discharges ink from nozzles. The image forming apparatus 1 is a printer that has a line head, and is capable of recording color images by discharging multiple colors of ink at the appropriate timings while moving the medium M against the line head.

The image forming apparatus 1 is equipped with a medium feeding unit 10, a forming operation unit 20, a medium ejection unit 30, a controller 40, and others. In this image forming apparatus 1, based on the control by the controller 40, the medium M stored in the medium feeding unit 10 is transported along a predetermined transport route to the forming operation unit 20, and after the image is recorded, the medium M is ejected to the medium ejection unit 30.

The medium feeding unit 10 sends the medium M stored therein to the forming operation unit 20 one sheet at a time.

The medium M includes printing paper of various thicknesses, as well as cells, films, fabrics, and various other materials, in this case those that can be curved and supported on the outer circumference of the image forming drum 21.

The medium feeding unit 10 has a feeding tray 11 for storing the medium M and a feeder board 12 for transporting the medium M from the feeding tray 11 to the forming operation unit 20. The feeding tray 11 is a plate-shaped member on which one or more medium M can be placed. The feeding tray 11 is designed to move up and down according to the amount of medium M placed on the feeding tray 11, and the topmost medium M is held in the position, in the up-down direction, where the topmost medium M is transported by the feeder board 12.

The feeder board 12 is equipped with a transporting mechanism that drives a ring-shaped belt 123 with the inner side supported by multiple (for example, two) rollers 121, 122 to transport the medium M on the belt 123, and a supply unit that passes the topmost medium M placed on the feeding tray 11 onto the belt 123. The feeder board 12 carries the medium M received on the belt 123 by the supply unit to be transported along the belt 123.

The forming operation unit 20 includes an image forming drum 21, a passing unit 22, a drum heater 231, a head unit 24 (discharge operation unit), an irradiation unit 25, an imaging unit 26, and a delivery unit 27.

The image forming drum 21 has a cylindrical outer shape and carries up to three sheets of medium M on the outer circumference of said cylindrical portion, and performs a transport operation of the medium M in response to a rotational movement about the central axis of the cylinder.

The passing unit 22 passes the medium M which was passed from the medium feeding unit 10 to the image forming drum 21. The passing unit 22 consists of a swing arm unit 221 that carries one end of the medium M transported by the feeder board 12, and a cylindrical passing drum 222 that passes the medium M carried by the swing arm unit 221 to the image forming drum 21. The medium M on the feeder board 12 is picked up by the swing arm unit 221 and passed to the passing drum 222, and thereby moved along the outer circumference of the image forming drum 21 to be passed to the image forming drum 21.

The drum heater 231 is located near the outer circumference of the image forming drum 21 and heats this circumference and the medium M. Here, the drum heater 231 is provided, in the rotational direction of the image forming drum 21, between the position where the medium M is passed to the image forming drum 21 by the passing unit 22 and the image forming position on the medium M by the head unit 24. The outer surface of the image forming drum 21 is heated by the drum heater 231 to bring the medium M to be carried to an appropriate temperature. This ensures that the ink curing speed and other factors are properly maintained when the ink lands on the medium M, and stable, high-quality images are formed. For example, an infrared heater is used for this drum heater 231.

The head unit 24 discharges, on one image forming target surface of the medium M moving in accordance with the rotation of image forming drum 21, ink droplets with appropriate timing from multiple nozzle openings provided on a surface (nozzle opening surface) of the medium M opposite the image forming target surface of the medium M in the head unit 24 to make the droplets land on the image forming target surface of the medium M and form images. The image forming apparatus 1 in the embodiment has multiple, four in this case according to the respective four colors of ink, head units 24 at predetermined intervals in the transport direction of the medium M. The four head units 24 are used here to output C (cyan), M (magenta), Y (yellow), and K (black) inks, respectively. These inks, for example, change phase between sol and gel states depending on temperature. The ink may also be cured by irradiation with ultraviolet light. In many cases, this type of ink is in a gel state at room temperature and becomes a sol when heated. Thus, the ink is heated and maintained at the appropriate temperature inside and/or outside the head unit 24 by the ink heater 232 (see FIG. 3), to be in a sol state.

Figure 2:
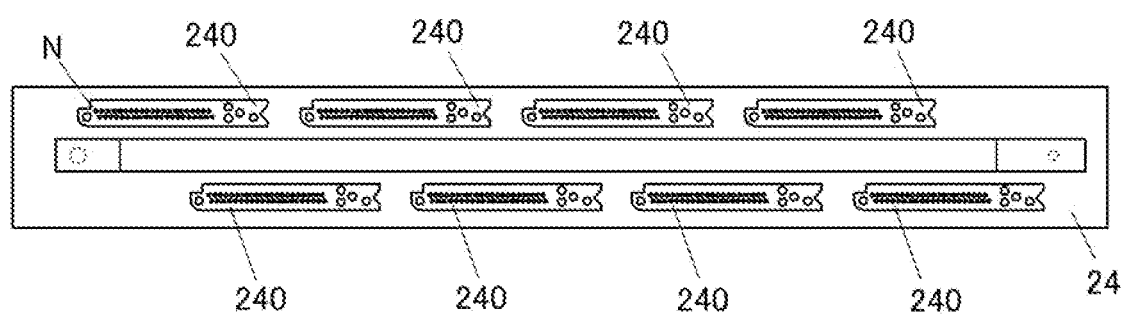
FIG. 2 is a bottom view of the ink discharge surface of the head unit.

FIG. 2 shows the bottom view showing the ink discharge surface of the head unit 24.

Each of the head units 24 has, for example, multiple recording heads 240 in a width direction (first direction) perpendicular to the transport direction (second direction) of the medium M transported on the image forming drum 21. The roughly equal number of nozzles N belong to each of the recording heads 240. On the bottom surface of each recording head 240, there are lined openings of nozzles N at even intervals in the width direction, and the array ranges of openings of the nozzles N in the respective recording heads 240 are continuous and the entire range is over the image forming width of the medium M (that is, the openings of nozzles N may be distributed in multiple locations in the transport direction, as long as they are arranged at appropriate intervals in the width direction). This enables the image forming apparatus 1 to form images in a single pass by discharging ink from the nozzle openings to the medium M to generate dots on the medium M while moving the medium M in the transport direction (relative movement). In other words, the head unit 24 is a line head.

The irradiation unit 25 emits energy rays (electromagnetic waves) of a predetermined wavelength, in this case, ultraviolet rays in the near-ultraviolet region (wavelength of about 400 nm) to cure and fix the ink (that is, the image formed by the ink dots) that is discharged from the head units 24 and lands on the medium M. The irradiation unit 25 has, for example, a light-emitting diode (LED 251) that emits ultraviolet light. The irradiation unit 25 emits ultraviolet light by applying a voltage to the LED 251 and passing an electric current through it, and thereby emitting light. The irradiation unit 25 is located so as to be able to fix the ink, that is, emit ultraviolet light onto the medium M transported by the rotation of the image forming drum 21 at a position downstream of the landing position of ink discharged from the head unit 24 and upstream of the position where the medium M is passed to the delivery unit 27.

The configuration of the irradiation unit 25 that emits ultraviolet light is not limited to LEDs. The irradiation unit 25 may have, for example, a mercury lamp. If the ink has a property of curing by receiving energy rays other than ultraviolet rays, various light sources emitting energy rays of wavelengths that cure the ink are provided instead of the above-mentioned configuration emitting ultraviolet rays.

The imaging unit 26 captures the surface of the medium M on which ink droplets land from the head units 24 and are fixed by the irradiation unit 25. The imaging unit 26 has, for example, a line sensor with a CCD sensor or a CMOS sensor. By taking one-dimensional images of the medium M transported by the operation of the transport unit in the width direction at appropriate timing, the entire image forming range on the surface of the medium M can be imaged. The imaging unit 26 is capable of capturing images in each of the RGB wavelength bands, for example, and can select image data in any of the wavelength bands as needed, or combine these image data for inspection processing or for setting the offset number described below.

The delivery unit 27 transports the medium M to the medium ejection unit 30 after the image forming operation is completed and the ink that has landed on the medium M has cured. The delivery unit 27 has a cylindrical passing roller 271, multiple (for example, two) rollers 272, 273, a loop belt 274 which has the internal surface supported by the rollers 272, 273, and the like. The passing roller 271 receives the medium M from the image forming drum 21 and guides it onto the belt 274. The delivery unit 27 transports the medium M, which is passed from the passing roller 271 to the belt 274, by moving it together with the belt 274 that moves circumferentially with the rotation of the rollers 272 and 273, to send the medium M to the medium ejection unit 30.

The medium ejection unit 30 stores the medium M sent out from the forming operation unit 20 by the delivery unit 27 until it is removed by the user. The medium ejection unit 30 has a plate-shaped ejection tray 31 or the like, on which the medium M after image formation is placed.

The controller 40 controls the operations of the medium feeding unit 10, the forming operation unit 20, and the medium ejection unit 30 to form images on the medium M in accordance with the data of the image to be formed by the image forming instruction (job) and the settings pertaining to the image forming operation.

Of the above components, the image forming drum 21, the passing unit 22, and the delivery unit 27 constitute the transport unit in the embodiment.

Figure 3:
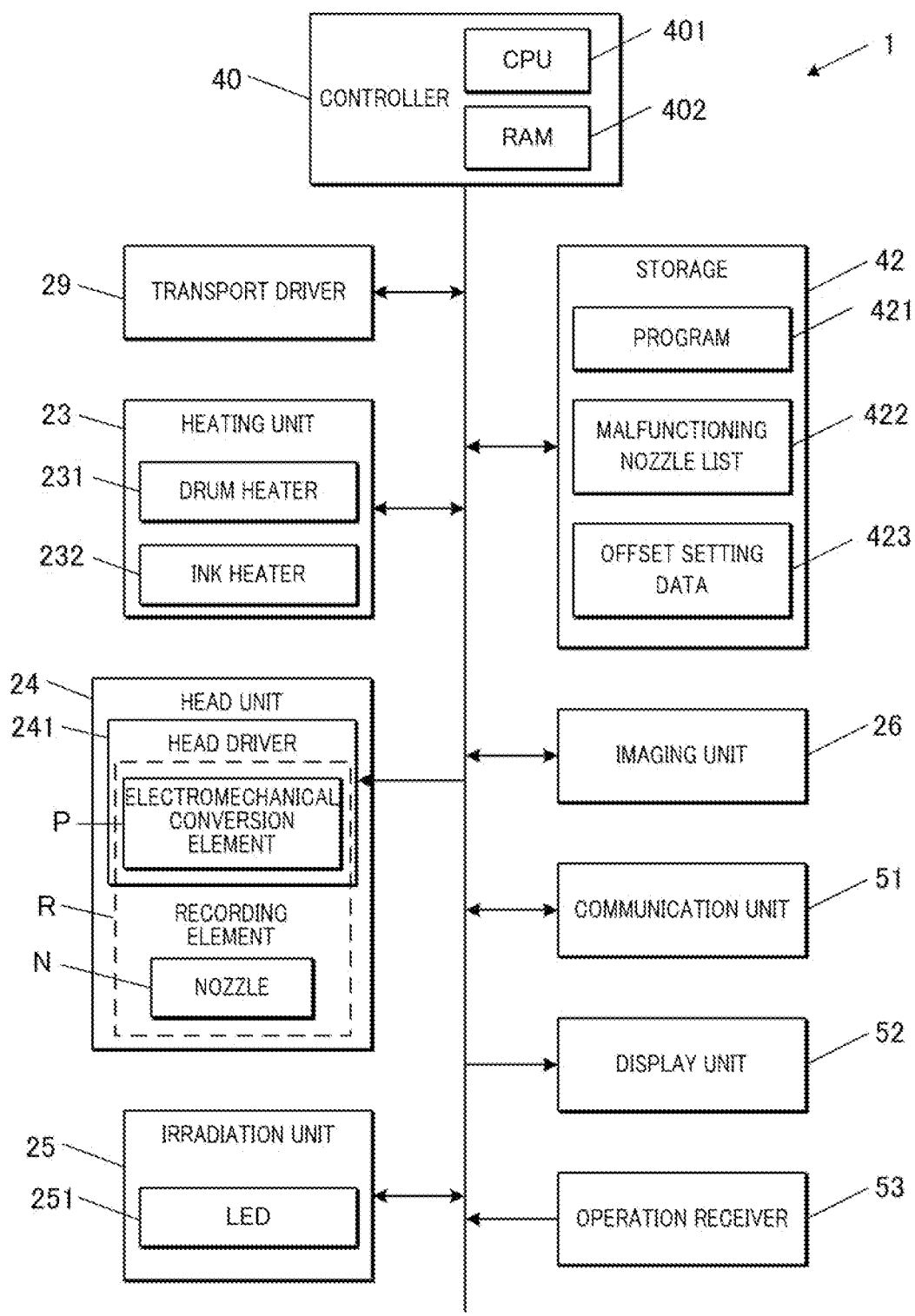
FIG. 3 is a block diagram showing the functional configuration of the image forming apparatus.

FIG. 3 is a block diagram showing the functional configuration of the image forming apparatus 1.

The image forming apparatus 1 consists of the head unit 24, the irradiation unit 25, the imaging unit 26, and the controller 40, as well as a heating unit 23, a transport driver 29, a storage 42 (storage), a communication unit 51, a display unit 52, and an operation receiver 53 (operation receiver).

The controller 40 includes a CPU (Central Processing Unit) 401, a RAM (Random Access Memory) 402, and the like. The CPU 401 is a hardware processor that performs various arithmetic operations. The RAM 402 provides a working memory space for the CPU 401 and stores temporal data.

The storage 42 is equipped with nonvolatile memory such as flash memory and stores various setting data and program 421. The program 421 includes a processing program for the missing supplementing process described below. The setting data includes a malfunctioning nozzle list 422 and offset setting data 423.

The transport driver 29 operates each part that performs the transport operation of the medium M, such as the image forming drum 21. The transport driver 29 outputs drive signals to each part involved in the transport operation based on the control signals output from the controller 40.

The heating unit 23 has, in addition to the drum heater 231 described above, an ink heater 232, and the like. The ink heater 232 heats and maintains the ink in a predetermined set temperature range to keep it in a sol state of appropriate viscosity, the ink being supplied from an ink supply (such as an ink tank), which is not shown in the figure, and stored and flowing within the head units 24. The temperatures of the ink and the outer surface of the image forming drum 21 can be measured by a temperature measuring unit, such as a thermistor, which is not shown in the figure, and the operation of the drum heater 231 and ink heater 232 may be controlled based on the measurement results. In the operation control, the on/off may be simply switched on and off according to the measured values, or control process based on well-known techniques such as PID control may be performed.

The head unit 24 has head drivers 241 and nozzles N, and the like. The head driver 241 has an electromechanical conversion element P and outputs electrical signals to deform said electromechanical conversion element P in a predetermined deformation mode, direction and size. The electromechanical conversion element P deforms the ink supply channel (especially the pressure chamber) connected to the nozzle N by deforming it in response to electrical signals. The electromechanical conversion element P is provided for each nozzle N. The electromechanical conversion element P is, for example, a piezoelectric element. The pair of electromechanical conversion element P and nozzle N constitutes the recording element R in the embodiment.

The waveform of the electrical signal (voltage) output by the head driver 241 to the electromechanical conversion element P is not particularly limited here. That is, the waveform may be rectangular or trapezoidal. The output timing is, for example, synchronized with the output cycle of a predetermined clock signal. In each output cycle, whether or not to output the waveform signal that causes ink to be discharged to the electromechanical conversion element P is switched, according to the data indicating whether or not to discharge ink from each nozzle, which is generated based on the image data to be formed or other data.

The irradiation unit 25 has the LED 251 as described above, and the LED 251 is selectively turned on while the area where ink is landing on the medium M passes through the irradiation range.

The transport driver 29 has a rotary motor or the like, and performs the rotational movement, synchronizing the above-mentioned image forming drum 21, rollers, and other configurations related to the transport movement of the medium M with the medium M at the rotation speed corresponding to the appropriate conveyance speed of the medium M.

The communication unit 51 controls the exchange of signals with the outside of the image forming apparatus 1. The communication unit 51 has, for example, a network card and transmits and receives signals to and from the outside by using a predetermined communication standard. The predetermined communication standards include, for example, TCP/IP for LANs. The communication unit 51 may also have a predetermined connection terminal, such as one of the various USB connection terminals, to be capable of directly sending and receiving data to and from peripheral devices via a USB cable or the like.

The display unit 52 provides various displays based on the control of the controller 40. The display unit 52 has a display screen, such as an LCD screen, for example, and can display menus and status of image forming operation on said display screen as appropriate. The display screen and the touch panel may be overlaid, and the controller 40 may detect the operation content by associating the display content of the display screen with the detection position of the touch operation. The display screen is not limited to LCDs, but may also be an organic EL (Electro-Luminescent) screen, and the like. The display unit 52 may have LED lamps or the like. The LED lamps may be used, for example, for the notifying operation of the power supply status, data transmission/reception status and/or the occurrence of operational abnormalities.

The operation receiver 53 accepts input operations from outside such as the user and outputs them as input signals to the controller 40. The operation receiver 53 is equipped with a touch panel, for example, to output information on the detected position during the detection of touch operations. The operation receiver 53 may have a key operation receiver such as a numeric keypad or a pushbutton switch.

Among the above components, at least the controller 40 is included in the processing device of the embodiment, and the storage 42, the operation receiver 53, and the like can further be included in said processing device.

Next, the generation of discharge data and missing supplementing process for the image forming operation setting method in the image forming apparatus 1 of the embodiment will be explained.

Figure 4:
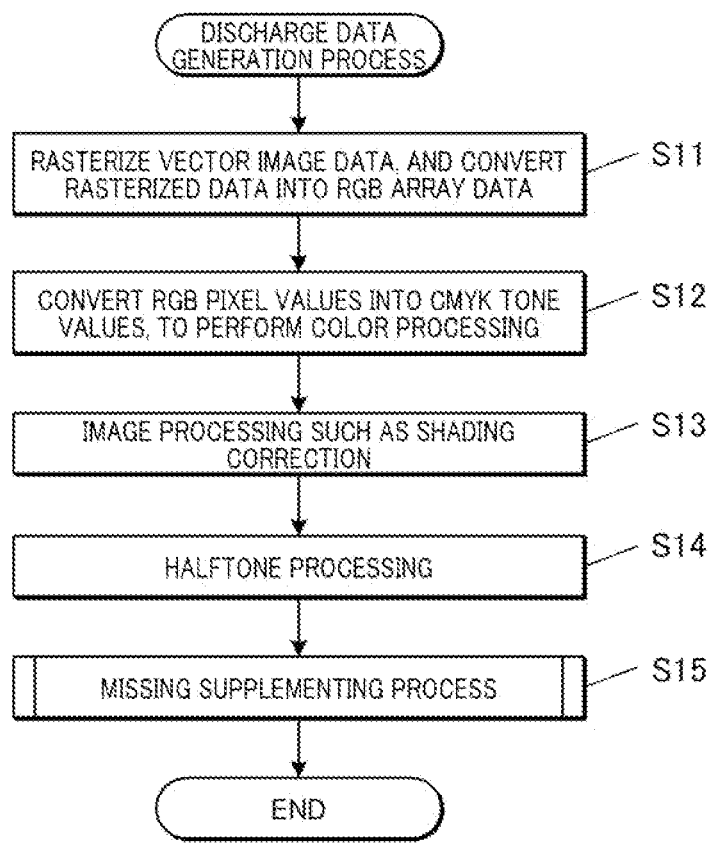
FIG. 4 is a flowchart indicating the flow of outline of the discharge data generation process.

FIG. 4 shows a flowchart showing the flow of outline of the discharge data generation process. Some or all of these processes may be done with dedicated hardware circuitry, or they may be done entirely in software by the CPU.

The discharge data is generated based on the image data to be output. The image data is, for example, image data in which figures (including character shapes and patterns) are represented as vectors. This image data is first rasterized and converted into an array data of RGB values (raster image data) for each pixel (step S11). This array data is further converted (color conversion) into data in which ink colors, that is, CMYK tone values are set (step S12). This image data (CMYK individual color image data, tone data for each pixel) is subjected to adjustment such as shading correction and limitation of the total amount of ink discharge (step S13), and then halftone processing is performed (step S14) and the data is converted into a binary dot representation (that is, the presence of ink discharge represents the distribution of dot positions) corresponding to the presence or absence of ink discharge at each transport position for each nozzle N (position determiner). When the amount of ink discharged from the nozzle N can be switched to multiple levels, each position may be represented by the value of the number of steps corresponding to the number of such levels (three steps when there are two levels of large and small droplets). This generates the initial data (operation setting data) for the discharge data.

Among the nozzles N corresponding to the discharge data determined in this way, there can be a malfunctioning nozzle (malfunctioning recording element) that causes malfunction pertaining to the ink discharge operation. If ink is discharged from the nozzles N, including a malfunctioning nozzle, by using this initial discharge data as it is, the ink from the malfunctioning nozzle will not be discharged normally and the ink discharge amount/position of the corresponding area will be abnormal. As a result, the area (white streaks) where ink does not land continuously occurs along the position in the width direction corresponding to the nozzle N, resulting in a noticeable degradation of the output image quality. To reduce this degradation of image quality, the missing supplementing process is performed (step S15) in which ink set to be discharged by the malfunctioning nozzle is substituted (supplemented) by the surrounding nozzles (normal recording elements).

Based on the discharge data generated and adjusted in this way, the head driver 241 outputs drive signals to each electromechanical conversion element P to control whether or not to discharge ink from the corresponding nozzle N.

Figure 5A:
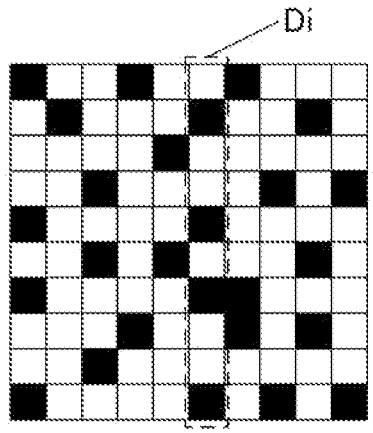
FIG. 5A is a view explaining the missing supplementing process.
Figure 5B:
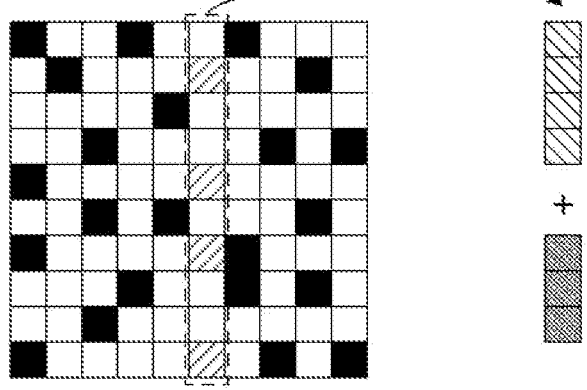
FIG. 5B is a view explaining the missing supplementing process.
Figure 5C:
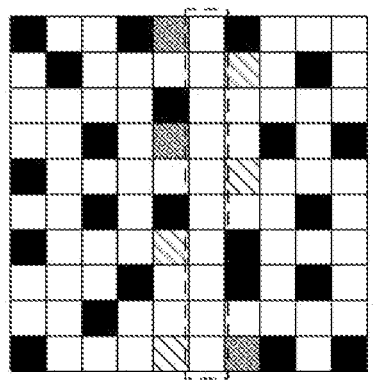
FIG. 5C is a view explaining the missing supplementing process.

FIGS. 5A through 5C illustrate the missing supplementing process in the embodiment.

In the discharge data shown in FIG. 5A, the horizontal direction corresponds to the width direction, that is, the nozzle N is specified for each row. The vertical direction corresponds to the transport direction and indicates whether or not ink is discharged at each nozzle N at each predetermined transport amount (time interval). In other words, the two-dimensional matrix of discharge data represents an array regarding whether each position is the dot position to discharge the ink to land on in a two-dimensional plane. Although the length about the width direction and the length about the transport direction are shown here as equal, these lengths may be different.

If the sixth nozzle N from the left in FIG. 5A is a malfunctioning nozzle that cannot discharge ink normally, in the area Di along the vertical direction corresponding to this nozzle N, ink is not discharged normally continuously. Therefore, the ink for the dot positions originally set to discharge ink in this area Di is covered by changing the setting so that the normal nozzles N on the left and right discharge ink as the substitute.

As shown in FIG. 5B, there are four ink discharge locations initially set up in the area Di. In addition to these four discharge settings being distributed to the surrounding nozzles N, the image forming apparatus 1 sets three additional dot positions. If the same number of discharge settings as the number of discharge settings to be cancelled due to malfunction are allocated to the surrounding nozzles N, then due to minute deviations within the normal range of ink discharge direction from nozzle N and variations in the size of landing area, neighboring nozzles may not be able to cover the area Di completely. If white streaks or other defects remain due to this type of ink landing state, the image quality will continue to deteriorate significantly. Thus, here, the number of dot positions (corrected dot number, that is, here the offset number is positive) which are a predetermined number (offset number) more than the number of dot positions set in the area Di are allocated as the ink discharge positions.

For example, as shown in FIG. 5C, seven dot positions which are four dot positions that were set within the area Di and additional three dot positions corresponding to the offset number are allocated to positions that can be additionally allocated (generation possible range) within a predetermined range around the original area Di. As in the past, the allocation is made based on the dot positions originally set in area Di, with priority given to neighboring positions on both sides in the width direction, and if these positions have already been set as dot positions, the dot positions can be allocated to further neighboring positions or to the front and rear positions in the transport direction. When the amount of ink droplets to be discharged can be set in multiple levels, it may be possible to change the discharge setting of a dot position that has already been set as a dot position but with a not maximum droplet amount to the setting to discharge a higher droplet amount. It is sufficient that the allocation for the additionally set offset number is balanced and set appropriately so that it is not biased against other dot positions that have already been set. The well-known conventional methods may be used for the criteria for setting these dot positions.

Figure 6A:
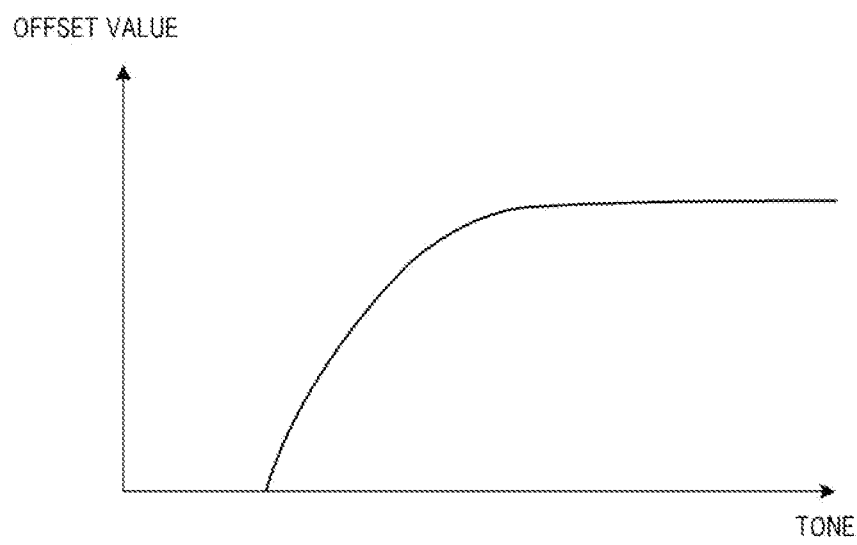
FIG. 6A is a view explaining the setting of the offset number.
Figure 6B:
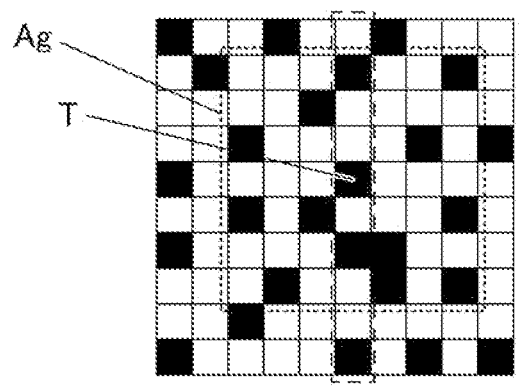
FIG. 6B is a view explaining the setting of the offset number.

FIGS. 6A and 6B illustrate the setting of the offset number.

In general, uneven density is more noticeable that is, the negative effect on image quality is greater when there is a position where no ink is discharged than when ink is discharged in duplicate at the same location. In particular, when the density (discharge rate within a unit area) is medium, and ink droplets that landed from adjacent nozzles N do not connect (or overlap) with each other where they should originally connect (or overlap) with each other on the medium M, the uneven density is noticeable, resulting in a noticeably unnatural-looking image. Since the landing size of ink droplets on the medium M is larger than the distance between dot positions, a slight variation in the discharge direction and landing size of the regular nozzles N is not a problem. However, in supplementary discharge with a nozzle N directly adjacent to the target nozzle, if the direction of discharge is off to the opposite side of the side to be supplemented, or if the landing size is small, as described above, the connection or overlap that is originally expected may not occur. In other words, the setting of the appropriate offset number can vary depending on the degree of variation in the discharge direction and the landing size.

Therefore, as shown in FIG. 6A, the offset amount (offset rate), which is the additional amount per unit area of the number of dots to be distributed from the malfunctioning nozzle to the surrounding nozzles N, may be changed according to the density tone value of the target area (original CMYK tone data) and the number of dot positions per unit area (predetermined range surrounding the dot generation range corresponding to the target malfunctioning nozzle). The correspondence relationship between the offset amount (or density tone, collectively, the value pertaining to the pixel tone) and the number of dot positions to be added (offset number) is determined in advance and stored in the storage 42 as offset setting data 423. Since this correspondence relationship can change over time with use, the corresponding relationship may be re-specified and the offset setting data 423 may be updated and changed in an appropriate manner. When the offset amount is changed using the density tone value, the dot position and the position of CMYK pixel data before the above halftone processing may be retained respectively so that the correspondence relationship between them can be easily specified.

Since the spreading of ink varies depending on the type of ink (color, dye or pigment differences, and the like) and the type of medium M on which the ink lands, these may be taken into account when changing the offset amount. Furthermore, the conspicuousness of uneven density depending on the variation can also be caused by the type of halftone processing (for example, error diffusion method or blue noise method). Thus, the offset setting data 423 may include, for example, multiple types of correspondence relationship for each type of ink, each type of medium M, and each type of halftone processing.

As shown in FIG. 6B, the unit area for counting the number of dot positions is set to an appropriate range Ag for the target position T. The range Ag does not necessarily have to be square (with same number of positions in the transport and width directions), and the target position T does not have to be the center position of the range Ag. Although a range of 7×7 dots is shown here as an example for illustration, it could be a completely different size (for example, a larger size according to human-visible scale or actual image pattern size, and the like.).

In addition, compared to the variations between individual nozzles N, large trend changes within the head unit 24, for example, variations between the recording heads 240, are often more noticeable. Therefore, the offset number may be determined for each of the recording heads 240 in the width direction, or for each of the regions obtained by dividing the recording head 240 into multiple regions. In this case, there may be cases where the tone value (the number of dot positions) varies widely within the recording head 240, but even in such cases, the offset number may be determined based on the representative value (average, median, and the like.).

Figure 7:
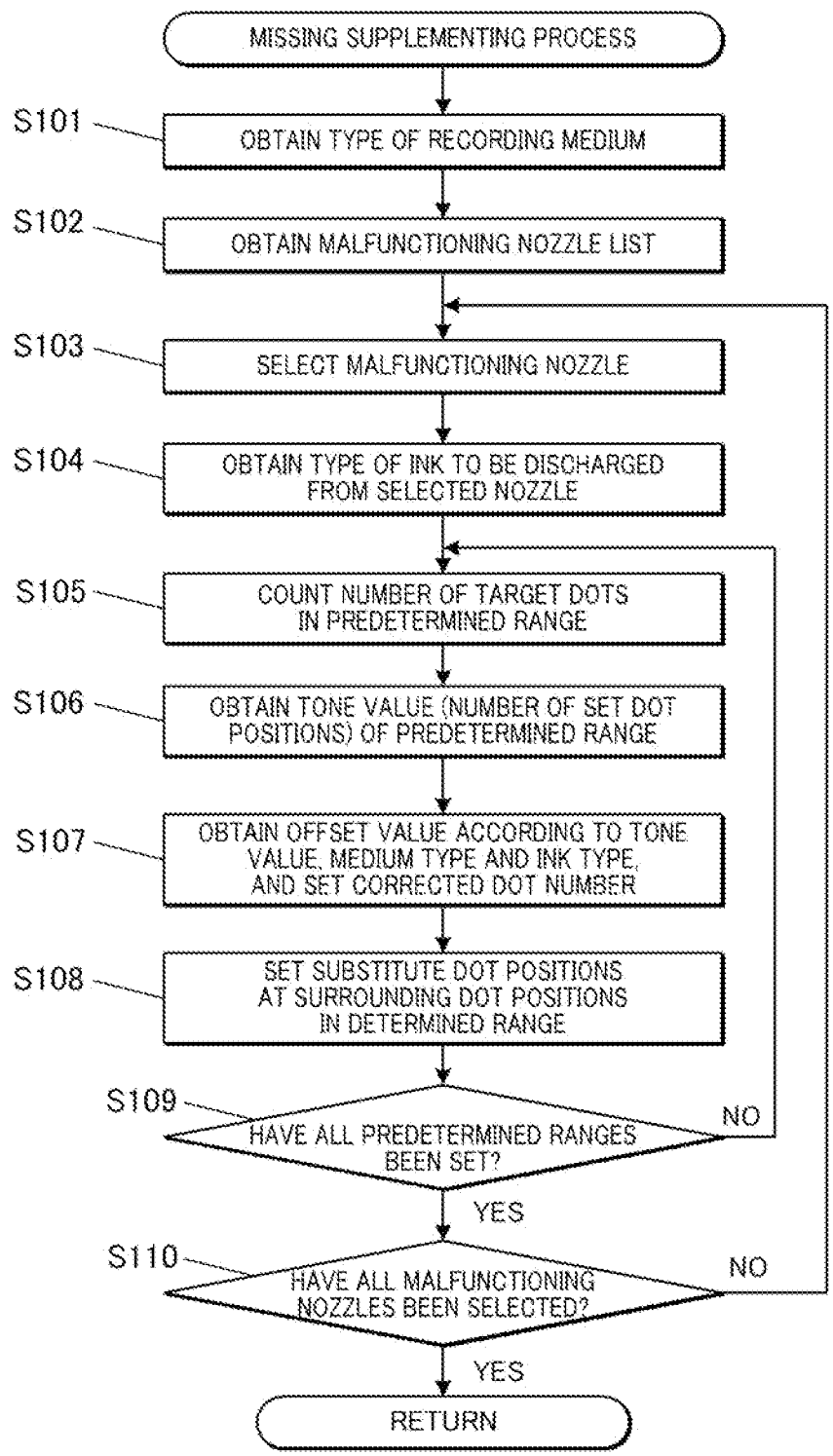
FIG. 7 is a flowchart showing the control procedure of the missing supplementing process.

FIG. 7 is a flowchart showing the control procedure of the missing supplementing process invoked in the discharge data generation process in FIG. 4. Here, explanation is made by assuming that the missing supplementing process is executed software by the CPU 401.

When the missing supplementing process is invoked, the CPU 401 obtains information on the type of medium M (step S101). The CPU 401 obtains the malfunctioning nozzle list 422 (step S102).

The CPU 401 selects an unselected malfunctioning nozzle from the obtained malfunctioning nozzle list 422 (step S103). The CPU 401 obtains information on the type of ink discharged by the selected malfunctioning nozzle (step S104).

The CPU 401 counts the number of dot positions that are set within a predetermined range with respect to the reference position for the selected malfunctioning nozzle (step S105). The CPU 401 acquires the tone value in the predetermined range (or counts the number of dot positions pertaining to all nozzles N) (step S106). The CPU 401 refers to the offset setting data 423 and obtains the offset number according to the obtained tone value, as well as the type of medium M and the type (color) of ink, and the like, which have been obtained previously (step S107; substitute number determiner). If the type of halftone processing to be applied to the image data to be formed has not yet been determined, and the CPU 401 is unable to specify which correspondence relationship to use, the correspondence relationship to use may be selected based on input operations by the user to the operation receiver 53. In this case, the CPU 401 may cause the display unit 52 to accept the selection operation.

The CPU 401 determines the dot positions of the transfer destination including the dot positions corresponding to the offset number, within the determined range for the dot position of the selected malfunctioning nozzle (step S108; position changer). The determined range is usually, but not limited to, the position range tangential to the dot position of the malfunctioning nozzle.

The CPU 401 determines whether all predetermined ranges according to the length in the transport direction of the image have been set for the selected malfunctioning nozzle. (step S109). If it is determined that a predetermined range that has not been set remains ("NO" in step S109"), the processing of the CPU 401 returns to step S105.

If it is determined that all predetermined ranges according to the length of the image have been set (in step S109, "YES"), the CPU 401 determines whether all the malfunctioning nozzles have been selected or not (step S110). If it is determined that there is a malfunctioning nozzle that has not been selected ("NO" in step S110), the processing of the CPU 401 returns to step S103. If it is determined that all the malfunctioning nozzles have been selected (in step S110, "YES"), the CPU 401 terminates the missing supplementing process and returns the process to the discharge data generation process.

OTHER EXAMPLES

Instead of table storing of the offset amount settings in the offset setting data 423 according to various conditions in advance as described above, a test image can be formed and the offset amount can be determined based on the results of the formation of said test image.

Figure 8:
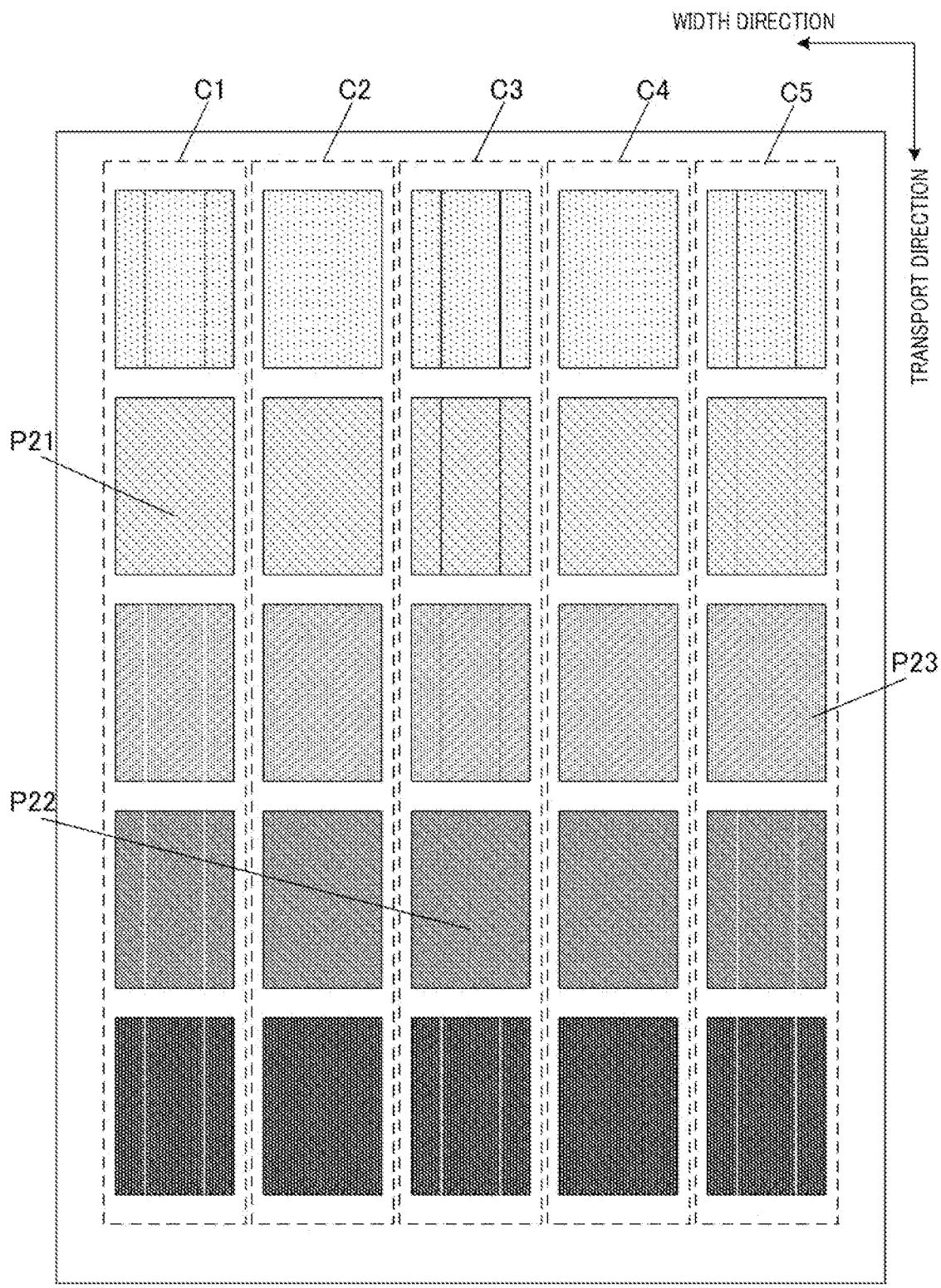
FIG. 8 is a view explaining the test image.

FIG. 8 is a view explaining the test image.

This test image contains multiple patch images, which are arranged in a two-dimensional array. The density, that is, the dot recording rate (placement rate), is defined as large or small (placement rates that differ from each other) in the transport direction, and ranges different from each other for the placement rate in the transport direction are set. In the width direction, the test image has, for example, five columns (rows) of patch images. Among them, columns C2 and C4 show halftone images (first pattern images) with a uniform placement rate according to the position in the transport direction described above. As opposed to the halftone images, columns C1, C3, and C5 are images (second pattern images) in which predetermined nozzles N are used as missing nozzles (missing recording elements) that do not discharge ink as pseudo-malfunctioning nozzles (placement rates are set to zero), and supplementary settings (that is, settings to distribute the dot positions to the surrounding positions) are made with supplementing rates obtained by adding different offset rates according to the width direction ranges to the dot positions for the relevant missing nozzles (placement rates at the positions (missing positions) in the width direction corresponding to the relevant missing nozzles). In each of the patch images for second pattern images, there may be not one missing nozzle, but multiple missing nozzles (two in this example) may be set periodically (at predetermined intervals) to make the same supplementary setting multiple times.

Here, the uneven density is least noticeable in the three images P21-P23 respectively pertaining to different placement rates from each other among the second pattern images. Thus, from the test image formation (output) results, the optimum offset number which makes the uneven density, that is, streaks and the like less noticeable for the density value is specified for each of the placement rates.

As described above, each second pattern image is arranged so that there is a first pattern image with the same placement rate for reference next to at least one of the left and right sides of the second pattern image. This makes it easy to compare and judge the degree of deviation of the second pattern image from the normal output. In addition, in image formation with line heads, the degree of variation on a larger spatial scale, for example, the degree of variation between the recording heads 240, often appear more significantly and noticeably, compared to the degree of variation of individual nozzles N. Therefore, it is preferable that the first pattern image to be compared is located near the second pattern image and, if possible, within the range of image formation by the same recording head 240.

The ranges about the width direction of the second pattern image may be in random order with respect to the offset number (supplementing rate). Similar to the above, the effect of temperature distribution in the head unit 24 can have a relatively large impact on the variation of ink discharge characteristics among the recording heads 240. In general, the temperature tends to be higher near the center of the head unit 24 with respect to the width direction and lower at both ends. For many inks, viscosity also increases at lower temperatures, and this tends to lead to lower discharge speeds and droplet volumes, as well as a reduction in the landing range after they have landed. The random order avoids such effects from occurring systematically and affecting the determination of the optimum offset number.

In the above, patch images were formed for five different dot placement rates and three different offset numbers, but the number of levels of patch images may be set arbitrarily. If the range in which the optimum offset number is expected is different depending on the type of medium M, the type of ink, or the type of halftone processing, the range of the offset number (supplementing rate) and/or placement rate (density tone) may be different for each of conditions pertaining to these types. These type information may be automatically determined by the controller 40 based on information held in advance, or one of them may be selected by the user or others through input operations to the operation receiver 53. Each patch image may not be formed across multiple recording heads 240. The test image may be formed for each of the recording heads 240.

The specifying of the optimum offset number (acquisition of selection conditions) may be performed automatically by the imaging unit 26 capturing a test image, or the optimum offset number may be specified by the user visually viewing the formed image and the specifying results may be input via the operation receiver 53. When specifying is performed automatically, the difference value of the average luminance value or the chromaticity (brightness L* or the like) to which the luminance value is converted (or which is directly measured) may be calculated for the range corresponding to the missing nozzle in the adjacent first and second pattern images (or the added value or average value if there are multiple), and the offset number may be specified based on the data of such difference value (difference data). The optimum offset number along the user's vision may also be specified based on visual transfer functions or other factors.

If the nozzles N included in the patch image formation range already contain a malfunctioning nozzle, the malfunctioning nozzle may be defined as a missing nozzle. Alternatively, at a stage where there are few malfunctioning nozzles, each patch image may be arranged so that said malfunctioning nozzles are removed from the patch image formation range. Accordingly, the spacing of multiple patch images about the width direction need not be even. Alternatively, if a completely fixed test image is formed each time, the drive data for outputting the test image may be stored and retained in the storage 42 in advance.

The above test image is formed for each ink type (dot color type), and the process of specifying the optimum offset number for each tone value is repeated. When different medium M are supplied, a test image is also formed for each type of said medium M.

When the offset number (setting conditions) is obtained in this way, according to the offset number, the dot positions for supplementing by the surrounding normal nozzles N (recording elements) in place of the dot positions set for the malfunctioning nozzle are determined by adjusting the number of dot positions for supplementing by the number corresponding to the offset number.

FIG. 9 is a flowchart showing the control procedure for another example of the missing supplementing process called for in the discharge data generation process in FIG. 4. Here, explanation is made by assuming that the missing supplementing process is executed software by the CPU 401.

When the missing supplementing process is invoked, the CPU 401 obtains information on the type of the medium M (step S121). The CPU 401 obtains the malfunctioning nozzle list 422 (step S122).

The CPU 401 determines whether or not a test image for the acquired medium M and ink type, as well as the malfunctioning nozzle, needs to be formed (step S123). If it is determined that test image formation is not necessary ("NO" in step S123"), the processing of the CPU 401 is shifted to step S127.

If it is determined that a test image needs to be formed (step S123, "YES"), the formation range of each patch image is set based on the position information of the malfunctioning nozzle (step S124). The CPU 401 causes the head unit 24 to form a test image including each set patch image (first pattern images and second pattern image) (step S125; adjustment image outputter).

The CPU 401 specifies the optimum offset number for each placement rate and for each ink type (step S126; obtainer). The specifying of the offset number, as described above, may be done automatically by having the test image captured by the imaging unit 26 and based on the analysis process of said test image, or it may be done by receiving an input operation of the specifying result based on visual inspection of the test image by the user. When accepting user input operations, the CPU 401 may display the input screen on the display unit 52 after the test image is formed, to wait until the input operation is performed. The specified result is stored in the offset setting data 423. Then, the CPU 401 shifts the process to step S127.

When the process moves to step S127, the CPU 401 obtains the offset number according to the tone value, medium type, and ink type, and sets the corrected dot number for each set range (step S127). The CPU 401 sets substitute dot positions to the peripheral dot positions for each set range (step S128; change content determiner). Then, the CPU 401 terminates the missing supplementing process and returns the process to the discharge data generation process.

The above process of specifying the offset number with the formation of a test image does not have to be done every time image formation is performed. Once specified, the offset number may be used repeatedly multiple times for the same ink type and the same type of medium M. It is sufficient that the process of specifying the offset number is performed, for example, when the offset number valid for the combination of ink type and the type of medium M has not been specified (new ink, medium, and the like), when a predetermined number (the number of sheets) of image forming operations have been performed since the previous specifying process, when a predetermined time has passed since the previous specifying process, or when an execution instruction is obtained by a user input operation. In this case, the processes related to the formation of the test image and the specifying of the offset number are not limited to cases where they are performed as part of the missing supplementing process. The processes may be done separately from the missing supplementing process.

As described above, the controller 40 as the processing device of the embodiment determines the dot positions at which dots are to be generated by multiple recording elements R (nozzles N and electromechanical conversion elements P) arranged in the width direction on the medium M which moves relative to the recording elements R in the transport direction crossing (orthogonal to) the width direction on the basis of tone data (CMYK data) for each pixel of the image to be formed. The controller 40 determines the corrected dot number which is obtained by adding an offset number to the number of dot positions by the malfunctioning recording element (malfunctioning nozzle) which is set in the malfunctioning nozzle list 422 as the recording element R by which dots are not generated normally. The controller 40 determines the corrected dot number of dot positions in the dot generation possible range by a recording element R other than the malfunctioning recording element.

In this way, when the malfunctioning recording element is supplemented by the operation of another recording element R, the dot position is increased or decreased by the amount of the offset number by the unit of dot, which supplements the incompleteness of supplementing according to the variation of operation of the recording element R in the normal range that is difficult to cover simply by adjusting the density of the original image. This allows the controller 40 to generate discharge data that can more appropriately reduce the degradation of image quality.

After generating the discharge data representing the dot positions in this way, the number of dots is directly increased or decreased by the offset number in conjunction with the adjustment for the malfunctioning nozzles, eliminating the need to adjust the original image data of the image to be formed. This means that the image quality degradation due to white-out and white streaks caused by ink not reaching the area where ink originally lands and covers the medium M can be more reliably suppressed by the extension of the conventional process.

The controller 40 may also determine the offset number based on the tone data. If gaps remain in areas that should be covered with ink or other color materials when the density tone is intermediate or higher, they are very noticeable and greatly degrade image quality. On the other hand, if the areas which originally have many gaps are filled in too much, the density tone will deviate greatly from the original density tone and unevenness in density will be noticeable. Therefore, the offset number is changed according to the density tone, and it is possible to appropriately minimize the degradation of image quality for each density tone.

The tone data to be associated with the offset number is determined by the number of dot positions set in a predetermined range surrounding the dot generation range corresponding to the malfunctioning recording element. In other words, even within the range based on the dot positions determined for the malfunctioning recording element, the offset number is determined based not on the density tone of the original image but on the number of surrounding dot positions. This allows the interpolation that more appropriately reflects the coverage state of the medium M according to the number of dots. Therefore, this processing device can generate more appropriate discharge data with less deterioration in image quality.

The processing device includes a storage 42 that stores the correspondence relationship between the value pertaining to the tone of pixel and the offset number as offset setting data 423. This offset setting data 423 can be changed. Since the correspondence relationship changes over time due to the continuous use of the recording element R, and the like, it is possible to continuously reduce the degradation of image quality by updating it as appropriate. By storing and maintaining such correspondence relationship in advance, the missing supplementing process can be easily performed.

The processing device includes an operation receiver 53. The storage 42 stores multiple types of the above correspondence relationships, and the controller 40 determines the offset number according to any of the correspondence relationships which was selected based on the input operation received by the operation receiver 53. Since the spread of the generated dots varies depending on various conditions, multiple types of correspondence relationships can be prepared according to such conditions, and the like, and by enabling to select the appropriate one, it is possible to stably and effectively suppress image quality degradation through appropriate missing supplementing that reflects the conditions.

The controller may also determine the offset number based on the type of medium M on which the image is to be formed. The above conditions include, for example, the type of medium M. By changing the offset number according to the medium M, discharge data that can suppress the occurrence of white streaks and other defects on the medium and reduce the degradation of image quality can be generated.

The controller may also determine the offset number based on the color of the dots generated by the recording element R. In particular, when the recording element R contains the nozzle N and discharges ink, the physical properties of said ink tend to differ depending on the color of the ink, and thus the way it spreads on the medium on which it lands will also differ. Therefore, by changing the offset number according to the color of the dots, this processing device can more appropriately generate discharge data that can reduce the degradation of image quality.

The multiple recording elements R belong to a recording head 240 among the multiple recording heads 240, and the controller may determine the offset number according to the recording head 240. Since the characteristics of dot generation often vary from one recording head 240 to another, which is the unit of production, by varying the correspondence relationship between the number of dot positions and the offset number according to the recording head 240, it is possible to generate discharge data that is less likely to result in non-uniform images.

The multiple recording elements R belong to the recording head 240, and the controller may determine the offset umber according to the multiple regions into which the recording head 240 is divided. By dividing more finely than the recording head 240, the temperature difference between the center and the edge of the recording head and the like can be more precisely handled to generate discharge data that can bring the image quality closer to uniformity.

The offset number may be positive. As described above, it is more noticeable that ink does not cover the necessary areas and leaves white streaks, and the like, than that more ink is discharged and more ink is duplicated than necessary. Therefore, by setting the offset number as positive, the discharge data can be used to more stably suppress large degradation of image quality.

The image forming apparatus 1 in this embodiment also includes a recording head 240 to which multiple recording elements R belong, a controller 40 or the like as the above processing device, and a head driver 241 that causes the recording head 240 to generate dots at the dot positions determined by the controller.

According to such an image forming apparatus 1, images can be formed with less deterioration in image quality due to appropriately generated and missing-supplemented discharge data.

In this image forming operation setting method in the embodiment, dot positions at which dots are to be generated by multiple recording elements arranged in the width direction on a medium M which moves relative to the recording elements in the transport direction crossing (orthogonal to) the width direction, based on tone data (CMYK pixel data) for each pixel of an image to be formed. In the image forming operation setting method, the corrected dot number is determined. The corrected dot number is a number obtained by adding the offset number to the number of dot positions by the malfunctioning recording element which is set in the malfunctioning nozzle list 422 as the recording element by which dots are not generated normally. The corrected dot number of dot positions are determined within a dot generation possible range by a recording element other than the malfunctioning recording element.

This image forming operation setting method makes it possible to more appropriately adjust, on a per-dot position basis, failure to supplement in missing supplementing due to variations in recording elements within the normal range, which could not be adequately covered by conventional technology, and it is possible to generate discharge data with more reliable suppression of image quality degradation due to residual white streaks, and the like.

In addition, by installing the program 421 for the above image forming operation setting in a computer that has a controller 40 and causing said controller 40 (CPU 401) to execute it, it is possible to easily and more appropriately, without the need for special hardware, generate discharge data, which is the drive data for image forming, so as not to reduce the image quality.

On the other hand, the processing device of the image forming apparatus 1 according to another example in the embodiment includes a controller 40. The controller 40 generates operation setting data pertaining to the operation of forming dots by the multiple recording elements R which are arranged in the width direction, for forming an image by an operation of causing the recording elements R to form dots and an operation of moving a medium M and the recording elements R relative to each other in the transport direction crossing (orthogonal to) the width direction. In generation of the operation setting data, the controller 40 determines dot positions at which the dots are to be recorded by the recording elements R based on tone data for each pixel of the image to be formed. The controller 40 outputs, by the recording elements R, a test image for obtaining a setting condition to supplement a dot position determined for a malfunctioning recording element that is set as a recording element R by which dots are not recorded normally. The controller 40 obtains the setting condition based on the output adjustment image, and determines a dot position pertaining to supplementing by a normal recording element, which is not the malfunctioning recording element, based on the setting condition. The test image includes multiple first pattern images that have placement rates of dot position different from each other in ranges different from each other in the transport direction, and includes, in different ranges from each other in the width direction, multiple second pattern images in each of which the placement rate is set to zero at the missing position corresponding to the missing recording element (missing nozzle) that is determined in advance as not to record a dot in the first pattern image of the placement rate corresponding to the range in the transport direction, and a supplementing process is performed to distribute the dot position to the position around the missing position at a supplementing rate obtained by adding an offset rate included in the setting condition to the placement rate pertaining to the missing position.

Thus, since the difference in appearance of unevenness and streaks according to the dot placement rate varies according to the nozzle N (recording element R), by arranging the patch images in the transport direction so that the patch images (second pattern images) can be formed with dot placement rates which are different in the range of a same nozzle N, it is possible to appropriately specify, for each placement rate, an offset number which is appropriate for suppressing the detailed image quality degradation such as occurrence of white streaks due to the above variation. Thus, this processing device can generate the discharge data which suppresses degradation in image quality more appropriately.

In the test image, first pattern images are located next to at least one side of second pattern images in the width direction. By easily comparing these images, faint white streaks and uneven density in the second pattern images can be easily seen, making it easy to determine the optimum offset number. In addition, it is easy to identify localized image quality degradation since there can be influence by large changes in ink discharge characteristics within the head unit 24 in the range of nozzles N that are located far apart.

Each of the second pattern images has multiple missing positions at predetermined intervals in the width direction, and supplementing process is performed on each of said multiple missing positions at the same supplementing rate according to the position in the transport direction. Thus, by providing multiple missing positions, not only just unevenness at one specific location, but also the tendency of easiness for average unevenness to occur in the range can be obtained, so that the degree of adjustment can be optimized more.

The supplementing rates in the multiple second pattern images (columns C1, C3, C5) arranged in the width direction are defined in a random order with respect to the arrangement order of the multiple second pattern images. This makes it easier to specify the optimum supplementing rate (offset number) at each placement rate (density tone) by reducing the effect of changes in discharge characteristics that can occur with large cycles in the width direction within the head unit 24.

The controller 40 determines each of at least one of the ranges to have different placement rates and the ranges to have different supplementing rates, according to the type of medium M on which the test image is to be output. Since the way dots spread varies depending on the material of the medium M and other factors, forming second pattern images with different ranges of placement rate and supplementing rate depending on the type of medium M eliminates the need to uniformly form the test image with placement rate and supplementing rate varied over a wider range than necessary. Thus, it is possible to obtain the discharge data which can suppress the image quality degradation efficiently and appropriately.

The controller 40 also obtains setting conditions based on the difference data between the formed first pattern images and the second pattern images. By taking the difference, the difference according to the presence or absence of the missing nozzle can be easily evaluated quantitatively, and the controller 40 can easily identify the amount and location of uneven shading, especially white streaking, caused by the difference.

The controller 40 also causes the test image to be output for each of the multiple types of dot colors. Since the way dots spread and look different for each color of ink and the like, and the nozzles N that record said dots are also different, separately outputting the test image for each provides discharge data that can suppress the degradation of the overall image quality of the color image.

Each of the multiple recording elements R belongs to one of the multiple recording heads 240, and the controller 40 performs control to output a test image for each of the recording heads 240. Since, in terms of manufacturing, the variation of discharge characteristics with the recording head 240 as a unit tends to be larger than the variation factors of other characteristics, it is easier to determine the status of image quality deterioration such as white streaks in each second pattern image by having the test image formed not across multiple recording heads 240. The offset number obtained for each of the recording heads 240 makes it possible to output discharge data with the reduction in image quality more appropriately suppressed.

The processing device is also equipped with an operation receiver 53. The controller 40 is capable of outputting first pattern images of multiple different patterns (types of halftone processing) and second pattern images based on the first pattern images. The controller 40 outputs the test image including a first pattern image by the pattern which was selected in accordance with the content of the input operation received by the operation receiver 53 and a second pattern image based on the first pattern image. By making it possible to output the test image for each pattern in which the characteristics of dot recording can differ, and by selecting a test image pattern according to the image to be formed by the user, it is possible to more accurately specify the appropriate offset amount to suppress image quality degradation.

The image forming apparatus 1 in another example of this embodiment has multiple recording elements R that are arranged in the width direction and record dots, a mover for moving the multiple recording elements R and the medium M relative to each other in the transport direction, the above controller 40 as the above processing device, and the like. According to this image forming apparatus 1, the discharge data obtained based on the image data to be formed can more appropriately suppress image degradation than before.

In the image forming operation setting method in another example of this embodiment, operation setting data (discharge data) pertaining to the operation of forming dots by the multiple recording elements R arranged in the width direction to form the image by means of the operation of forming dots by the multiple recording elements R and the operation of moving the medium M and the multiple recording elements R relative to each other in the transport direction crossing the width direction is generated. In the generation of this operation setting data, the dot positions at which dots are to be recorded by the multiple recording elements R are determined based on the tone data of each pixel of the image to be formed, and a test image is output by the multiple recording elements R to obtain setting conditions to supplement the dot positions defined for the malfunctioning recording element that is set as a recording element R that does not record dots normally. The setting conditions are obtained based on the output test image, and the dot positions for supplementing by the normal recording elements R other than the malfunctioning recording element are determined based on the setting conditions.

The test image includes multiple first pattern images with different placement rates of dot position in different ranges in the transport direction, and includes, in different ranges in the width direction, multiple second pattern images in each of which the placement rate is set to zero at a missing position corresponding to a missing recording element (missing nozzle) that is determined in advance as not to record a dot in a first pattern image of the placement rate corresponding to a range in the transport direction, and a supplementing process is performed to distribute the dot position to a position around the missing position at a supplementing rate that is the placement rate pertaining to the missing position to which an offset rate included in the setting condition is added.

By outputting such a test image and specifying the optimum supplementing rate (offset number), this image forming operation setting method can more appropriately obtain an image to be formed with less deterioration in image quality.

In addition, by installing the program 421 for the above-mentioned image forming operation setting method and having it executed by the controller 40 (CPU 401), it is possible to easily generate discharge data to form images with less deterioration in image quality than before without the need for special hardware.

The present invention is not limited to the above-described embodiment and various modifications are possible.

For example, in the embodiment, halftone processing was used to generate discharge data according to the binary value or the number of steps of ink droplet size, but the method is not limited to this. Other well-known methods, such as the dither method, may also be used.

In the above embodiment, the width direction which is the array direction of nozzles N and the transport direction of medium M are described as orthogonal, but this is not limited to this. It is possible to form images in the same way even if they intersect at an angle other than 90 degrees.

The operation pertaining to ink discharge by a malfunctioning nozzle may be cancelled with the allocation to another nozzle N. However, if no ink is discharged at all, there is no need to bother to perform cancellation setting.

In the above embodiment, the correspondence relationship between the number of dot positions and the offset number is described as being set according to the type of medium, color of ink (dots), type of halftone processing, and the like. However, some or all of these may not necessarily be determined. When setting up a correspondence relationship for two or more of these, the correspondence relationship may be determined for each of all combinations, or the representative value (mean, median, and the like) of the offset numbers obtained for the respective correspondence relationships may be determined as the final offset number.

In the above embodiment, the offset number is described as a positive value, but is not limited to this. It may be possible to set a negative value for the offset number, since in some situations the negative effect by overlapping dots may be greater. The offset number, if not zero, need not necessarily be variable according to density tone (number of dot positions) or other factors. In the variable case, part of range of the density tone (number of dot positions) may include a portion for which the offset number is zero.

In the another example, the second pattern images are described as being adjacent to the first pattern images, but this is not necessarily the case. The first pattern image may be only located in one or two rows, for example, at one or both ends or in the center with respect to the width direction, and there may be rows of second pattern images that are not adjacent to said first pattern images.

The supplementing rate (offset rate) may be varied in ascending or descending order as per the order of the rows of the second pattern images. This makes it easier for the user to recognize the offset rate according to the number of dot positions when making a visual judgment.

The row of missing nozzle in the patch images is not limited to being a single row or periodically located at predetermined intervals. There may be multiple rows of missing nozzles at irregular intervals.

In the above embodiment, the multiple recording heads are described as line heads arranged in the width direction, but the recording head is not limited to this. A single recording head may be used. The image forming apparatus may be a scanning type apparatus which has the head unit 24 scanned against the medium M. The medium M need not be transported by the image forming drum 21. The medium M may be transported on a flat surface. In addition, the above embodiment is described as an image forming apparatus with four CMYK color inks, but the ink colors may be different from these, or the number of colors may be less or more than four. The same color inks with different components, such as two types of black colors, may be discharged respectively.

In the above embodiment, the image forming apparatus 1 is an inkjet recording apparatus. However, as long as the image forming apparatus is an image forming apparatus with multiple recording elements that form dots in a row, the missing supplementing process can be applied according to the contents explained in the above embodiment.

In the above embodiment, the discharge data generation process including the missing supplementing process is described as being performed by the controller 40 of the image forming apparatus 1, but the process is not limited to this. The final discharge data which was obtained by missing supplementing process and the like at an external terminal device may be sent to the image forming apparatus 1, which simply performs image forming operations based on the discharge data. The discharge data generation process may be distributed and executed by multiple electronic devices or other devices.

In the above description, the computer-readable medium for storing the program 421 for the missing supplementing control of the present invention is described as a storage 42 including a nonvolatile memory such as a flash memory, and the like as an example, but is not limited thereto. Other computer-readable medium include HDDs, EEPROMs, and MRAMs, and other nonvolatile memory, CD-ROMs, DVD disks, and other portable storage medium can be applied. A carrier wave is also applied to the present invention as the medium to provide data of the program according to the present invention through the communication lines.

The details of the configurations, contents and procedures of processing operations, and the like shown in the embodiments can be suitably changed without leaving the scope of the present invention. The scope of the invention includes the scope of the claims and their equivalents.

Although embodiments of the present invention have been described and illustrated in detail, the disclosed embodiments are made for purposes of illustration and example only and not limitation. The scope of the present invention should be interpreted by terms of the appended claims.

What is claimed is:

1. A processing device comprising a hardware processor that:
   determines a dot position at which a dot is to be generated by multiple recording elements arranged in a first direction on a medium which moves relative to the recording elements in a second direction crossing the first direction, based on tone data for each pixel of an image to be formed;
   determines a corrected dot number that is a number of a dot position by a malfunctioning recording element to which an offset number is added, wherein the malfunctioning recording element is set as a recording element by which a dot is not generated normally among the recording elements; and determines the corrected dot number of a dot position within a dot generation possible range by a recording element other than the malfunctioning recording element.

2. The processing device according to claim 1, wherein the hardware processor determines the offset number based on the tone data.

3. The processing device according to claim 2, wherein the tone data to be associated with the offset number is determined by a number of a dot position which is set in a predetermined range surrounding a dot generation range corresponding to the malfunctioning recording element.

4. The processing device according to claim 2, further comprising a storage in which a correspondence relationship between a value pertaining to a tone of a pixel and the offset number is stored, wherein
the correspondence relationship is changeable.

5. The processing device according to claim 4, further comprising an operation receiver, wherein
multiple types of correspondence relationships are stored in the storage, and
the hardware processor determines the offset number by a correspondence relationship which is selected based on an input operation that is received by the operation receiver among the correspondence relationships.

6. The processing device according to claim 2, wherein the hardware processor determines the offset number based on a type of the medium on which the image is to be formed.

7. The processing device according to claim 2, wherein the hardware processor determines the offset number based on a color of the dot to be generated by the recording element.

8. The processing device according to claim 2, wherein
the recording elements belong to a recording head among multiple recording heads, and
the hardware processor determines the offset number according to the recording head.

9. The processing device according to claim 2, wherein
the recording elements belong to a recording head, and
the hardware processor determines the offset number according to multiple regions into which the recording head is divided.

10. An image forming apparatus comprising:
a recording head to which the multiple recording elements belong;
the processing device according to claim 1; and
a driver which causes the recording head to generate the dot at the determined dot position.

11. An image forming operation setting method comprising:
determining a dot position at which a dot is to be generated by multiple recording elements arranged in a first direction on a medium which moves relative to the recording elements in a second direction crossing the first direction, based on tone data for each pixel of an image to be formed;
determining a corrected dot number which is a number of a dot position by a malfunctioning recording element to which an offset number is added, wherein the malfunctioning recording element is set as a recording element by which a dot is not generated normally among the recording elements; and
determining the corrected dot number of a dot position within a dot generation possible range by a recording element other than the malfunctioning recording element.

12. A non-transitory storage medium storing a computer-readable program causing a computer to function as:
a position determiner that determines a dot position at which a dot is to be generated by multiple recording elements arranged in a first direction on a medium which moves relative to the recording elements in a second direction crossing the first direction, based on tone data for each pixel of an image to be formed;
a substitute number determiner that determines a corrected dot number which is a number of a dot position by a malfunctioning recording element to which an offset number is added, wherein the malfunctioning recording element is set as a recording element by which a dot is not generated normally among the recording elements; and
a position changer that determines the corrected dot number of a dot position within a dot generation possible range by a recording element other than the malfunctioning recording element.

13. A processing device comprising a hardware processor that generates operation setting data pertaining to a dot forming operation by multiple recording elements which are arranged in a first direction, for forming an image by an operation of causing the recording elements to form a dot and an operation of moving a medium and the recording elements relative to each other in a second direction crossing the first direction, wherein
the hardware processor
determines a dot position at which the dot is to be recorded by the recording elements based on tone data for each pixel of the image to be formed,
outputs, by the recording elements, an adjustment image for obtaining a setting condition to supplement a dot position determined for a malfunctioning recording element that is set as a recording element by which a dot is not recorded normally among the recording elements,
obtains the setting condition based on the output adjustment image, and
determines, based on the setting condition, a dot position pertaining to supplementing by a normal recording element which is other than the malfunctioning recording element, and the adjustment image
includes multiple first pattern images that have placement rates of the dot position different from each other in ranges different from each other in the second direction, and
includes, in ranges different from each other in the first direction, multiple second pattern images in each of which the placement rate is set to zero at a missing position corresponding to a missing recording element that is determined in advance as not to record a dot in a first pattern image of the placement rate corresponding to a range in the second direction among the first pattern images, and a supplementing process is performed to distribute the dot position to a position around the missing position at a supplementing rate that is the placement rate pertaining to the missing position to which an offset rate included in the setting condition is added.

14. The processing device according to claim 13, wherein, in the adjustment image, a first pattern image among the first pattern images is located next to at least one side in the first direction of a second pattern image among the second pattern images.

15. The processing device according to claim 13, wherein a second pattern image among the second pattern images includes multiple missing positions at a predetermined interval in the first direction, and the supplementing process is performed to each of the missing positions at the supplementing rate.

16. The processing device according to claim 13, wherein the supplementing rate in each of the second pattern images arranged in the first direction is determined in a random order with respect to an arrangement order of the second pattern images.

17. The processing device according to claim 13, wherein the hardware processor determines each of at least one of the ranges to have the different placement rates and ranges to have different supplementing rates, according to a type of a medium on which the adjustment image is to be output.

18. The processing device according to claim 13, further comprising an operation receiver, wherein the hardware processor is able to output first pattern images which have multiple patterns different from each other and second pattern images based on the first pattern images, and the hardware processor outputs the adjustment image including a first pattern image by a pattern which is selected according to a content of an input operation received by the operation receiver among the first pattern images and a second pattern image based on the first pattern image among the second pattern images.

19. An image forming operation setting method, comprising:
generating operation setting data pertaining to a dot forming operation by multiple recording elements which are arranged in a first direction, for forming an image by an operation of causing the recording elements to form a dot and an operation of moving a medium and the recording elements relative to each other in a second direction crossing the first direction;
determining a dot position at which the dot is to be recorded by the recording elements based on tone data for each pixel of the image to be formed;
outputting, by the recording elements, an adjustment image for obtaining a setting condition to supplement a dot position determined for a malfunctioning recording element that is set as a recording element by which a dot is not recorded normally among the recording elements;
obtaining the setting condition based on the output adjustment image; and
determining, based on the setting condition, a dot position pertaining to supplementing by a normal recording element which is other than the malfunctioning recording element, wherein
the adjustment image
includes multiple first pattern images that have placement rates of the dot position different from each other in ranges different from each other in the second direction, and
includes, in ranges different from each other in the first direction, multiple second pattern images in each of which the placement rate is set to zero at a missing position corresponding to a missing recording element that is determined in advance as not to record a dot in a first pattern image of the placement rate corresponding to a range in the second direction among the first pattern images, and a supplementing process is performed to distribute the dot position to a position around the missing position at a supplementing rate that is the placement rate pertaining to the missing position to which an offset rate included in the setting condition is added.

20. A non-transitory storage medium storing a computer-readable program causing a computer to function as a generator that generates operation setting data pertaining to a dot forming operation by multiple recording elements which are arranged in a first direction, for forming an image by an operation of causing the recording elements to form a dot and an operation of moving a medium and the recording elements relative to each other in a second direction crossing the first direction, wherein
the generator includes:
a position determiner that determines a dot position at which the dot is to be recorded by the recording elements based on tone data for each pixel of the image to be formed;
an adjustment image outputter that outputs, by the recording elements, an adjustment image for obtaining a setting condition to supplement a dot position determined for a malfunctioning recording element that is set as a recording element by which a dot is not recorded normally among the recording elements;
an obtainer that obtains the setting condition based on the output adjustment image, and
a change content determiner that determines, based on the setting condition, a dot position pertaining to supplementing by a normal recording element which is other than the malfunctioning recording element; and
the adjustment image
includes multiple first pattern images that have placement rates of the dot position different from each other in ranges different from each other in the second direction, and
includes, in ranges different from each other in the first direction, multiple second pattern images in each of which the placement rate is set to zero at a missing position corresponding to a missing recording element that is determined in advance as not to record a dot in a first pattern image of the placement rate corresponding to a range in the second direction among the first pattern images, and a supplementing process is performed to distribute the dot position to a position around the missing position at a supplementing rate that is the placement rate pertaining to the missing position to which an offset rate included in the setting condition is added.

* * * * *